United States Patent Office 3,070,543
Patented Dec. 25, 1962

3,070,543
LOW SOLIDS DRILLING FLUID
Platho P. Scott, Jr., Tulsa, Okla., assignor to Pan American Petroleum Corporation, Tulsa, Okla., a corporation of Delaware
No Drawing. Filed Mar. 25, 1960, Ser. No. 17,484
12 Claims. (Cl. 252—8.5)

This invention relates to low solids drilling fluids. More particularly, it relates to an additive for giving a drilling fluid some of the properties of a high-solids mud while having a drilling rate close to the high rate which is obtainable with water.

For several years, clear water or water containing a low solids content has been used as the circulating fluid in well drilling operations because of the high drilling rate which results. Two of the difficulties are low viscosity, which results in failure to lift bit cuttings efficiently, and high fluid loss, which results in excessive loss of water to the drilled permeable formations. Obviously, it would be desirable to have a drilling fluid possessing the higher viscosity and lower fluid loss properties of high solids muds, but retaining most of the high drilling rate properties of clear water. Preferably, the drilling fluid should include means for preventing the accumulation and suspension of a high concentration of drilled solids in the drilling fluid. Preferably also, the drilling fluid should be compatible with and responsive to treatment with ordinary drilling fluid additives.

An object of this invention is to provide a drilling fluid having a high drilling rate, high viscosity, and a low fluid loss. Another object of the invention is to provide an additive for water to form such a drilling fluid. An object of the invention is also to provide a method which will permit high drilling rates, but which will effectively remove cuttings and prevent excessive loss of water to formations drilled.

In general, I accomplish the objects of my invention by the use of a particular type of clay together with a polymer. The clay must be of the montmorillonite class. Preferably it should be bentonite. The polymer is a vinyl-maleic copolymer. In the copolymerization the vinyl radical may be introduced through compounds such as the ester or ether, for example, vinyl acetate or vinylmethyl ether. The maleic radical may be introduced through compounds such as maleic acid, maleic anhydride or salts or amides. Preferably, the ratio of vinyl to maleic radicals is one to one. The amount of vinyl radicals may, however, be as much as about 1.5 times the amount of maleic radicals on a molar basis. The preferred copolymer for my purposes is the copolymerization product of equal molar amounts of vinyl acetate and maleic anhydride prepared as further described in U.S. Patent 2,476,474 Baer. As described in more detail in the Baer patent, the polymerization should be carried to such an extent as to produce a viscosity between about 1 and 3 centipoises at 25° C. when in solution in water at a concentration of 0.4 percent by weight. This polymer may be used either unneutralized or as a salt, preferably the calcium salt.

The principal requirements of the copolymer are that it be polymerized to such an extent that it will flocculate most clays, but will beneficiate montmorillonitic clays, and that it be water-dispersible to an extent of at least about 0.5 pound per 42 gallon barrel of water. When the term "water-soluble copolymer" is used hereinafter, a copolymer being water-soluble or water-dispersible to at least this degree will be intended. My invention will be better understood by consideration of the following data which for purposes of convenience are presented in the form of examples.

EXAMPLE I

Various concentrations of bentonite were dispersed in fresh water and the drilling fluid properties were measured. These properties were compared with those of the same bentonite dispersion containing several concentrations of the preferred polymer with and without soda ash. The results are presented in Table I. The plastic viscosities and yield values were measured with a multi-speed Fann viscosimeter. The instrument and method of use are described in detail in the article "Meter Aids Exact Mud Control," by J. C. Melrose and W. B. Lillenthal on page 136 of the July 1, 1952, issue of World Oil. The funnel viscosities, fluid losses and Stormer viscosities were measured by the equipment and methods described in the API Recommended Procedure 29. The polymer in these tests was the copolymer of vinyl acetate and maleic anhydride containing between 1 and 1½ times as many moles of vinyl acetate as maleic anhydride and containing sufficient lime to form a partial calcium salt of the polymer. When concentrations are stated in pounds per barrel, a 42 gallon barrel is intended.

Table 1

| | Concentration of polymer (lb/bbl) | | | | | | | | | |
|---|---|---|---|---|---|---|---|---|---|---|
| | 0 | | 0.025 | | 0.05 | | 0.10 | | 0.20 | |
| Conc. soda ash (lb./bbl.) | 0 | 1 | 0 | 1 | 0 | 1 | 0 | 1 | 0 | 1 |
| 3 percent bentonite: | | | | | | | | | | |
| Plastic vis. (cps.) | 2 | ---- | 4 | 8 | 4.5 | 9 | 4.5 | 9 | 6 | 9 |
| Yield value (lb./100 sq. ft.) | 1.5 | ---- | 2 | 12 | 1 | 14 | 2 | 14 | 3 | 6 |
| Funnel vis. (sec.) | 30 | ---- | 33 | 39 | 32 | 41 | 33 | 45 | 37 | 45 |
| Fluid loss (cc/30 min.) | 26 | ---- | ---- | ---- | 23 | 25 | 17 | 22 | 16 | 16 |
| Stormer vis. (cps.) | 6 | ---- | ---- | 28 | ---- | 30 | ---- | 32 | ---- | 33 |
| 4 percent bentonite: | | | | | | | | | | |
| Plastic vis. (cps.) | 4 | 6 | 10 | 11 | 12 | 12 | 10 | 16 | 13 | 22 |
| Yield value (lb./100 sq. ft.) | 1 | 13 | 15 | 25 | 10 | 31 | 6 | 32 | 18 | 27 |
| Funnel vis. (sec.) | 32 | 43 | 48 | 56 | 49 | 66 | 45 | 126 | 55 | 292 |
| Fluid loss (cc./30 min.) | 22 | 26 | 22 | 24 | 21 | 23 | 15 | 20 | 14 | 13 |
| Stormer vis. (cps.) | 8 | ---- | ---- | ---- | ---- | ---- | ---- | ---- | ---- | ---- |
| 5 percent bentonite: | | | | | | | | | | |
| Plastic vis. (cps.) | 6 | 7 | 15 | 25 | 18 | 19 | 18 | 19 | 26 | 34 |
| Yield value (lb./100 sq. ft.) | 2 | 23 | 30 | 40 | 22 | 57 | 15 | 64 | 22 | 54 |
| Funnel vis. (sec.) | 34 | 50 | 99 | 176 | 111 | 270 | 86 | ---- | ---- | ---- |
| Fluid loss (cc./30 min.) | 19 | 20 | ---- | ---- | ---- | ---- | ---- | ---- | ---- | ---- |
| Stormer vis. (cps.) | 13 | ---- | ---- | ---- | ---- | ---- | ---- | ---- | ---- | ---- |
| 6 percent bentonite: | | | | | | | | | | |
| Stormer vis. (cps.) | 22 | ---- | ---- | ---- | ---- | ---- | ---- | ---- | ---- | ---- |

A comparison of the properties of the 3 percent bentonite slurry containing 0.20 pound per barrel of the polymer, but no sodium carbonate, to the properties of the 5 percent bentonite slurry containing no treatment should be made. It will be apparent that by substituting 0.2 pound per barrel (0.06 percent) of the polymer for 2 percent bentonite about the same or slightly improved drilling fluid properties are obtained. It is well known in the art that a reduction of 40 percent in the bentonite concentration provides a substantial increase in drilling rate. Further data on this point are found in Example VII and VIII.

Tests of 4 percent bentonite slurries containing no treatment, containing 1 pound per barrel of soda ash, and containing the soda ash plus 0.025 pound per barrel of polymer demonstrate how the polymer enhances the treating action of the sodium carbonate. Looking at it another way, the data show how the sodium carbonate enhances the action of the polymer. Additional information on this point is presented in Example IV. Data on the effects of the polymer on the action of other treating chemicals are presented in Example V. The combination effects of soda ash and the polymer are claimed in U.S. patent application Serial Number 17,481, filed March 25, 1960, by Paul E. Robertson.

The data show that the concentration of bentonite in the drilling fluid should be at least about 3 percent by weight if the polymer is to produce very much effect. The data also show that the amount of bentonite should not be very much greater than 5 percent by weight or the effect may be too great. Obviously, this range can be extended somewhat by using large amounts of polymer with a low concentration of bentonite or a small amount of polymer with a high concentration of bentonite. The practical limits, however, are about 2 and 7 percent of bentonite. The lower limit is set by the high cost of the large amount of polymer required to obtain good effects. In addition, high concentrations of the polymer tend to decrease the drilling rate. The upper limit is set by the decreased drilling rate which occurs when higher concentrations of bentonite are used.

The amount of polymer should be at least about 0.01 pound per barrel of drilling fluid even with high concentrations of bentonite. The amount of polymer should not ordinarily be much greater than about 0.3 pound per barrel, principally for economic reasons. Under special circumstances, use of up to about 0.5 pound per barrel or even more, may be advisable. Preferably about 0.1 pound per barrel of polymer and about 4 percent by weight of bentonite should be used, particularly if soda ash is also used in a concentration of about 1 pound per barrel.

EXAMPLE II

To determine the applicability of vinyl-maleic copolymers other than the preferred calcium salt of the reaction product of vinyl acetate and maleic anhydride, the effects of two copolymers identified in Table II were tested. Results of the tests are presented in Table II.

*Table II*

| Treating agent | PVA/MA [1] | PVM/MA [2] |
| --- | --- | --- |
| Conc. (lb./bbl.) | ¼ | ¼ |
| Plastic viscosity (cps.) | 15 | 10 |
| Yield value (lb./100 sq. ft.) | 10 | 10 |
| Fluid loss (cc./30 min.) | 17 | 18 |

[1] PVA/MA is the same polyvinyl acetate/maleic anhydride copolymer as in Example I except that no lime is added to form the calcium salt.
[2] PVM/MA is the ammonium salt of the half amide of the copolymer of vinyl-methyl ether and maleic anhydride.

It will be apparent that the unneutralized copolymer of polyvinyl acetate and maleic anhydride is quite satisfactory. It will also be seen that the quite different ammonium salt of the half amide of the copolymer of vinylmethyl ether and maleic anhydride is also operative for my purposes.

EXAMPLE III

Oil is frequently used in water-base drilling fluids. To determine the effects of oil on a drilling fluid containing bentonite and my polymer, the tests reported in Table III were run. In this case the polymer was the same as that described in Example I. The oil was number 2 diesel fuel. The viscosity values are plastic viscosity as determined on the variable speed Fann viscosimeter. The yield values are in pounds per 100 square inch and the fluid loss values are in units of cubic centimeters per 15 minutes, as determined with the apparatus and method described in API Recommended Procedure 29.

*Table III*

| Suspension | Polymer, (lb./bbl.) | Oil, percent (vol.) | Drilling fluid properties | | |
| --- | --- | --- | --- | --- | --- |
| | | | Visc. | Yield value | Fluid loss |
| 6% bentonite | | | 8 | 7 | 10 |
| Do | 0.4 | | 20 | 22 | 7 |
| Do | 0.4 | 5 | 40 | 38 | 7 |

It will be apparent from the data in Table III that oil is not only compatible with the polymer and bentonite, but serves to produce an additional viscosity increasing effect.

EXAMPLE IV

Samples of a 3 percent bentonite suspension containing 0.05 pound per barrel of the polymer described in Example I were treated with various amounts of sodium carbonate. The Stormer viscosities of the resulting drilling fluids are reported in Table IV.

*Table IV*

| Concentration of sodium carbonate (lb./bbl.): | Stormer viscosity (c.p.s.) |
| --- | --- |
| 0 | 20 |
| ¼ | 24 |
| ½ | 28 |
| ¾ | 29 |
| 1 | 30 |
| 1¼ | 30 |
| 1½ | 32 |

It will be apparent that use of from about ½ to about 1½ pound per barrel of soda ash, preferably about 1 pound per barrel seems advisable.

EXAMPLE V

The stability and response of 5 percent bentonite suspensions to ordinary drilling fluid treating agents with and without the polymer and soda ash are shown in Table V.

*Table V*

| Treatment | Conc. (lb./bbl.) | Properties | | | | | |
| --- | --- | --- | --- | --- | --- | --- | --- |
| | | Plastic vis. (cps.) | | Yield value (lb./100 sq. ft.) | | Fluid loss (cc./30 min.) | |
| | | A[1] | B[2] | A[1] | B[2] | A[1] | B[2] |
| None | | 14 | 18 | 38 | 53 | 14 | 16 |
| Quebracho | ⅛ | | | | | | |
| Caustic | ⅛ | 12 | 22 | 19 | 23 | | 15 |
| Quebracho | ¼ | | | | | | |
| Caustic | ¼ | 13 | 9 | 13 | 4 | 11 | 14 |
| Quebracho | 1 | | | | | | |
| Caustic | 1 | 12 | | 2 | | 12 | |
| Calcium lignosulfonate | ¼ | | | | | | |
| Caustic | ½ | 14 | 12 | 108 | 21 | | 15 |
| Calcium lignosulfonate | 1 | | | | | | |
| Caustic | 1 | 14 | 10 | 126 | 21 | 12 | 14 |
| Modified lignosulfonate | ¼ | | | | | | |
| Caustic | ¼ | 14 | 13 | 23 | 20 | | 14 |
| Modified lignosulfonate | ½ | | | | | | |
| Caustic | 1 | 17 | 10 | 49 | 9 | 11.5 | |
| Mangrove bark | ¼ | | | | | | |
| Caustic | ¼ | 13 | 19 | 16 | 13 | | 16 |
| Mangrove bark | ½ | | | | | | |
| Caustic | 1 | 14 | 12 | 33 | 5 | 12.0 | |
| Lignite | ¼ | | | | | | |
| Caustic | ½ | 18 | 10 | 33 | 9 | | 16 |
| Lignite | ½ | | | | | | |
| Caustic | ½ | 13 | 8 | 7 | 3 | 13.5 | |
| Sapp | ⅛ | 13 | 10 | 6 | 5 | 12.5 | 16 |

[1] A=5% bentonite suspension.
[2] B=5% bentonite-polymer suspension (0.1 lb./bbl. polymer and 1.0 lb./bbl. soda ash).

The effect of the polymer on the effectiveness of the treating agents shown in Table V is much the same as with sodium carbonate. That is, the polymer seems to enhance the effectiveness of the treating agents, making possible the use of much smaller quantities of the agents. In some cases, the combination of the polymer and treating agents can obviously be used to obtain results not obtainable with the treating agents alone. In all cases it is apparent that the polymer is compatible with the treating agents.

EXAMPLE VI

To determine the effects of salts on bentonite suspensions treated with polymer and soda ash, 5 percent and 3 percent bentonite slurries were prepared and tested as shown in Table VI.

*Table VI*

| Suspension | Contaminant | Conc. (lb./bbl.) | Plastic vis. (cps.) | Yield value (lb./100 sq. ft.) | Funnel vis. (sec.) | Fluid loss (cc./30 min.) |
|---|---|---|---|---|---|---|
| 5% Bentonite | | | 6 | 7 | 38 | 17 |
| Do | Sodium chloride | ½ | 6 | 18 | 45 | 19 |
| Do | Calcium sulfate | 1 | 5 | 18 | 46 | 52 |
| 3% Bentonite | | | 3 | 3 | 33 | 24.5 |
| 3% bentonite 0.025 lb./bbl. polymer, 1.0 lb./bbl. soda ash. | Sodium chloride | ⅛ | 8 | 9 | 42 | 26 |
| Do | do | ¼ | 8 | 8 | 41 | 26 |
| Do | do | ½ | 8 | 8 | 42 | 27 |
| Do | do | ¾ | 8 | 8 | 42 | 25.5 |
| Do | do | 1 | | | | 30 |
| Do | do | 1½ | | | | 37 |
| Do | Calcium sulfate | 1 | 10 | 6 | 43 | 28 |

The polymer and soda ash seem to stabilize the viscosity and yield value properties against the effects of sodium chloride, but the fluid loss begins to become excessive at salt concentrations above about 1 or 1½ lb./bbl. (3,000 to 4,500 p.p.m.). Use of the polymer in brines containing more than about 5,000 parts per million of alkali and alkaline earth metal chlorides and sulfates is not, therefore, ordinarily recommended.

EXAMPLE VII

The effects of the polymer on drilling rates was determined with a 3½ inch diameter 3-cone rock bit and blocks of Berea sandstone using a laboratory drilling apparatus. In one case, a 3 percent bentonite suspension treated with polymer and soda ash and having a Stormer viscosity of 20 centipoises was used. In the other case, a 5 percent bentonite dispersion having a Stormer viscosity of 14 centipoises was used. In spite of the higher viscosity of the treating suspension, it drilled 12.5 percent faster than the untreated bentonite slurries. It will be apparent that the small amount of polymer and soda ash does not substantially affect drilling rates in spite of the increase in viscosity.

EXAMPLE VIII

Upon completion of laboratory tests, a field test of the polymer was conducted in Martin County, Texas. The higher drilling rates experienced in the laboratory with polymer-treated bentonite suspensions were substantiated in the field test. In one well a 4 percent bentonite slurry containing 0.05 lb./bbl. of polymer and 1.0 lb./bbl. of soda ash was used in drilling the 900 feet from 11,110 to 12,000 feet. In an off-set location, a drilling fluid was used having 9 percent bentonite and native solids with no polymer or soda ash. Rotating time for drilling the interval of 900 feet was 142 hours, using the treated drilling fluid, and was 192 hours, using the untreated drilling fluid. The drilling fluid properties of the two muds were approximately the same. The drilling time in the case of the treated mud, however, was about 25 percent less. The reduction in rotating hours equals about 5 days of rig time or a saving of about $5,000. Costs for the treated mud were about 8 percent less, bit costs were essentially the same. No unusual problems were experienced in the application of the polymer.

In the drilling operation in the field, there was, of course, some accumulation of drilled solids in the drilling fluid. These drilled solids did not seem to decrease the drilling rate in the presence of the treating materials. This is thought to be because of the flocculating action of the polymer on non-bentonitic clays. The polymer has the unusual ability to flocculate most clays, but to beneficiate bentonitic clays. Therefore, at the same time the polymer is acting to increase the viscosity of the bentonite slurry, it also acts to prevent disintegration and dispersion of drilled shales and clays since these are almost always non-bentonitic. This means the bit cuttings remain sufficiently large to be removed by the shale shaker or to settle in the mud pits. Even those small particles or bit cuttings which were not removed remain in a particle size range above the colloidal range. It has been previously found that those particles in the colloidal range are most detrimental to drilling rates.

When the term "consisting essentially of" is used hereinafter in connection with a composition, it will be understood that this term is intended to indicate a composition which may contain not only the named ingredients, but also other materials, such as drilled solids, treating chemicals and the like, which do not substantially adversely affect the properties of the composition for its intended use.

The polymer, soda ash and bentonite may be added separately, if desired. The polymer and soda ash can be added as solid powders or they can be first dissolved or dispersed in water. Dispersion of the polymer in water can sometimes be facilitated by mixing the polymer first with a little alcohol or oil to separate the particles before they contact water. The same effect can be obtained by premixing the polymer with the sodium carbonate, bentonite or both.

The polymer, the bentonite, and the other drilling fluid additives can be added in any order. It is generally most convenient, however, to add them simultaneously. It is best to start with clear water in preparing a drilling fluid so any drilled solids do not have a chance to disintegrate and disperse into the colloidal range before the polymer is added. It is possible, however, to add the polymer to a drilling fluid containing several percent of drilled solids to cause flocculation and precipitation of these solids before the bentonite is added. Some of the advantages of the invention can be obtained by adding both the bentonite and the polymer to drilling fluid containing drilled solids. The drilling fluid should ordinarily be diluted with water in such cases, before adding the bentonite and polymer, to decrease the solids content. In some cases, as when the solids content is low, however, no dilution is required.

As usual, a small amount of polymer and bentonite should be added intermittently or continuously during drilling operations to make up for losses to the formation, when cleaning the settled solids from mud pits, and the like. A high ratio of polymer to bentonite should be used in this make-up-stream. The reason is to compensate for losses of the polymer on bit cuttings which were separated in the mud pits. The polymer is thought to prevent disintegration of bit cuttings, principally by becoming adsorbed on the surfaces of such solid particles. When the cuttings are separated in the mud pits, some of the polymer is lost from the system. The excess polymer is to make up for this loss.

A convenient concentrate or additive for forming or treating drilling fluids is a mixture of the polymer and bentonite. For forming drilling fluids from fresh water, the concentrate should contain about 100 times as much bentonite as polymer. For make-up addition during drilling operations, the additive may contain as little as 10 times as much bentonite as polymer. For use in preparing drilling fluids containing high concentrations of bentonite, as high as 1000 times as much bentonite as polymer may be used. Since the polymer is lost from the system on bit cuttings, as previously noted, it is ordinarily best to use an additive containing about 100 times as much bentonite as polymer and then add polymer unmixed with bentonite to increase the ratio of polymer to bentonite.

The polymer may be used alone to flocculate drilled solids and maintain clear water for drilling. In this case, a small amount will remain in the water when it is decided to mud up. Theoretically, this amount may be taken into account in calculating the quantity of polymer to add with the bentonite. Actually, however, this amount already in solution can be ignored since it is so small compared to the quantity required for beneficiating the bentonite.

One advantage of the polymer is that it can be used with poor grades of bentonite to increase the effectiveness of such material to a point comparable to that expected for good grades of bentonite. This can be particularly important in relatively inaccessible areas having readily available poor grades of bentonite, but no high-quality clays. There may be some question whether a clay which does not greatly increase the viscosity of water is a poor-quality of bentonite, or is some other type of clay. This can be simply determined by mixing some of the clay into the water and adding a little of the polymer. If the clay is simply a low-grade bentonite, the viscosity will be increased by the polymer. If the clay is of another type, it will be flocculated and precipitated by the polymer.

By use of the polymer, the viscosity of water containing a very low concentration of bentonite can be increased and the fluid loss can be decreased to increase the efficiency of the water when used as a fracturing fluid. Due to the low concentration of bentonite, there is less tendency for the fracture to become plugged by the clay when the well is put back on production. The same advantage applies to dilute clay slurries used opposite zones to be perforated with bullet or jet perforators.

Still other advantageous applications of my invention will be apparent to those skilled in the art.

I claim:

1. An additive for increasing the viscosity of water consisting essentially of a mixture of montmorillonitic clay and a water-soluble vinylmaleic copolymer, said copolymer containing from about 1 to about 1.5 times as many vinyl radicals as maleic radicals and being polymerized to a degree such that a 0.4 percent by weight aqueous solution has a viscosity of between about 1 and about 3 centipoises at 25° C., the weight of said clay being from about 10 to about 1000 times the weight of said copolymer.

2. The additive of claim 1, in which said clay is bentonite.

3. The additive of claim 1, in which said copolymer is prepared from vinyl acetate and maleic anhydride.

4. The additive of claim 3 in which said clay is bentonite and said copolymer contains sufficient calcium hydroxide to form at least a partial calcium salt of said copolymer.

5. A low solids drilling fluid consisting essentially of water containing no more than about 5000 parts per million by weight of alkali and alkaline earth metal chlorides and sulfates, from about 2 to about 7 percent by weight of a montmorillonitic clay, and from about 0.01 to about 0.5 pounds per barrel of a water-soluble vinyl-maleic copolymer, said copolymer containing from about 1 to about 1.5 times as many vinyl radicals as maleic radicals and being polymerized to a degree such that a 0.4 percent by weight aqueous solution has a viscosity of between about 1 and about 3 centipoises at 25° C.

6. The drilling fluid of claim 5, in which said clay is bentonite.

7. The drilling fluid of claim 5 in which said copolymer is prepared from vinyl acetate and maleic anhydride.

8. The drilling fluid of claim 7, in which said clay is bentonite and said copolymer contains sufficient calcium hydroxide to form at least a partial calcium salt of said copolymer.

9. A method of drilling a well comprising operating a bit in the bottom of said well to drill the well deeper and thus produce bit cuttings and circulating in said well the drilling fluid of claim 5, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

10. A method of drilling a well comprising operating a bit in the bottom of said well to drill the well deeper and thus produce bit cuttings and circulating in said well the drilling fluid of claim 6, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

11. A method of drilling a well comprising operating a bit in the bottom of said well to drill the well deeper and thus produce bit cuttings and circulating in said well the drilling fluid of claim 7, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

12. A method of drilling a well comprising operating a bit in the bottom of said well to drill the well deeper and thus produce bit cuttings and circulating in said well the drilling fluid of claim 8, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

References Cited in the file of this patent

UNITED STATES PATENTS

| 2,702,788 | Dawson | Feb. 22, 1955 |
| 2,718,497 | Oldham et al. | Sept. 20, 1955 |
| 2,948,678 | Turner et al. | Aug. 9, 1960 |

FOREIGN PATENTS

| 725,460 | Great Britain | Mar. 2, 1955 |
| 517,883 | Canada | Oct. 25, 1955 |
| 553,011 | Canada | Feb. 11, 1958 |

OTHER REFERENCES

McGhee: New Oil Emulsion Speeds West Texas Drilling, article in the Oil and Gas Journal, Aug. 13, 1956. pages 110–112.

Mallory: How Low Solids Muds Can Cut Drilling Costs, article in the Petroleum Engineer, April 1957, pages B21, B22, B23, B24.